United States Patent
Park et al.

(10) Patent No.: US 10,216,475 B2
(45) Date of Patent: Feb. 26, 2019

(54) USER TERMINAL DEVICE AND CONTROL METHOD THEREOF

(71) Applicant: SAMSUNG ELECTRONICS CO., LTD., Suwon-si, Gyeonggi-do (KR)

(72) Inventors: Kyung-won Park, Seoul (KR); Je-ik Kim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/668,971

(22) Filed: Aug. 4, 2017

(65) Prior Publication Data

US 2018/0210698 A1 Jul. 26, 2018

(30) Foreign Application Priority Data

Jan. 20, 2017 (KR) .................. 10-2017-0009647

(51) Int. Cl.
 *H03G 3/00* (2006.01)
 *G06F 3/16* (2006.01)
 *H04R 3/00* (2006.01)
 *H04W 88/02* (2009.01)

(52) U.S. Cl.
 CPC .............. *G06F 3/165* (2013.01); *H04R 3/00* (2013.01); *H04R 2430/01* (2013.01); *H04W 88/02* (2013.01)

(58) Field of Classification Search
 CPC .................................. G06F 3/165; H04R 3/00
 See application file for complete search history.

(56) References Cited

U.S. PATENT DOCUMENTS

| 7,761,091 B2 | 7/2010 | Dunn, Jr. et al. |
| 9,374,657 B2 | 6/2016 | Tu et al. |
| 2008/0058037 A1* | 3/2008 | Dunn ................... H04R 1/1041 455/575.2 |
| 2012/0317314 A1* | 12/2012 | Choi ................. H04M 1/72527 710/8 |

FOREIGN PATENT DOCUMENTS

| JP | 4904868 | 3/2012 |
| JP | 5505104 | 5/2014 |
| KR | 2003-0010213 | 2/2003 |
| KR | 20-0424413 | 8/2006 |

* cited by examiner

*Primary Examiner* — Simon King
(74) *Attorney, Agent, or Firm* — Nixon & Vanderhye P.C.

(57) ABSTRACT

A user terminal device for controlling a volume of an external audio output device and a control method thereof are provided. The method of controlling the user terminal device for changing the volume of the external audio output device includes receiving an input corresponding to a user command for changing state information of the external audio output device, receiving the state information of the external audio output device from the external audio output device, and changing a state of a device, which is to be changed based on the user command, based on state information of the user terminal device and the state information of the external audio output device.

17 Claims, 16 Drawing Sheets

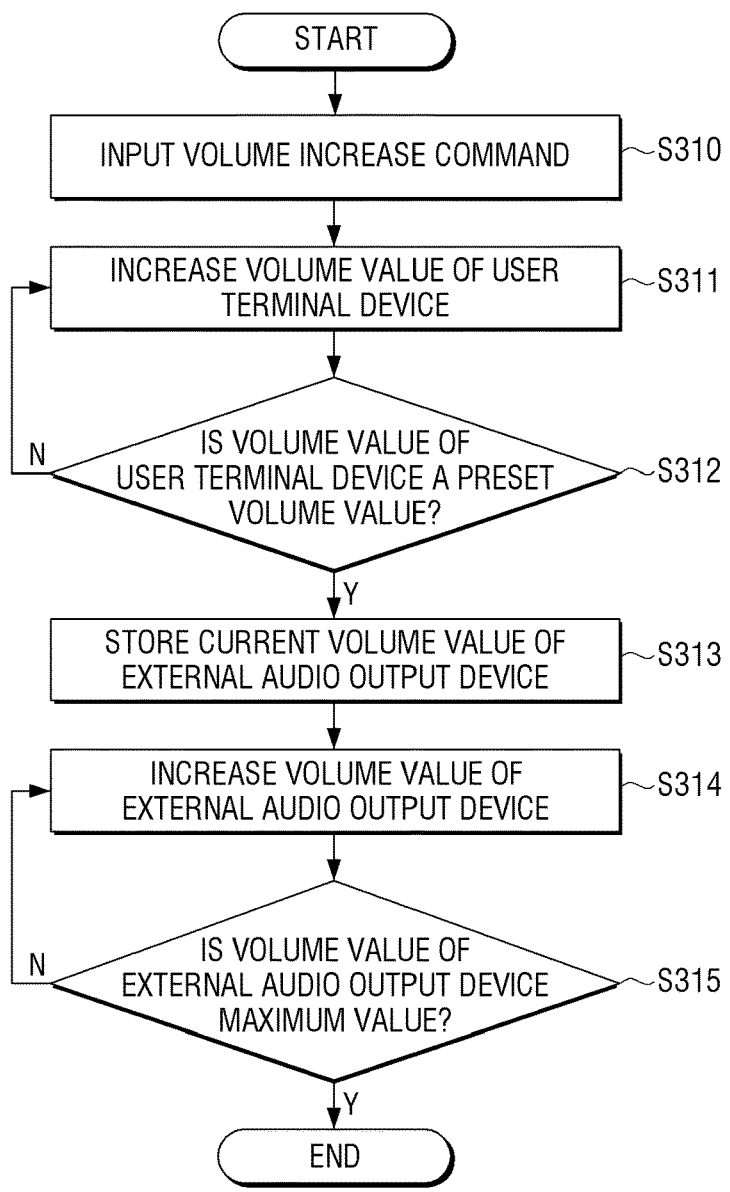

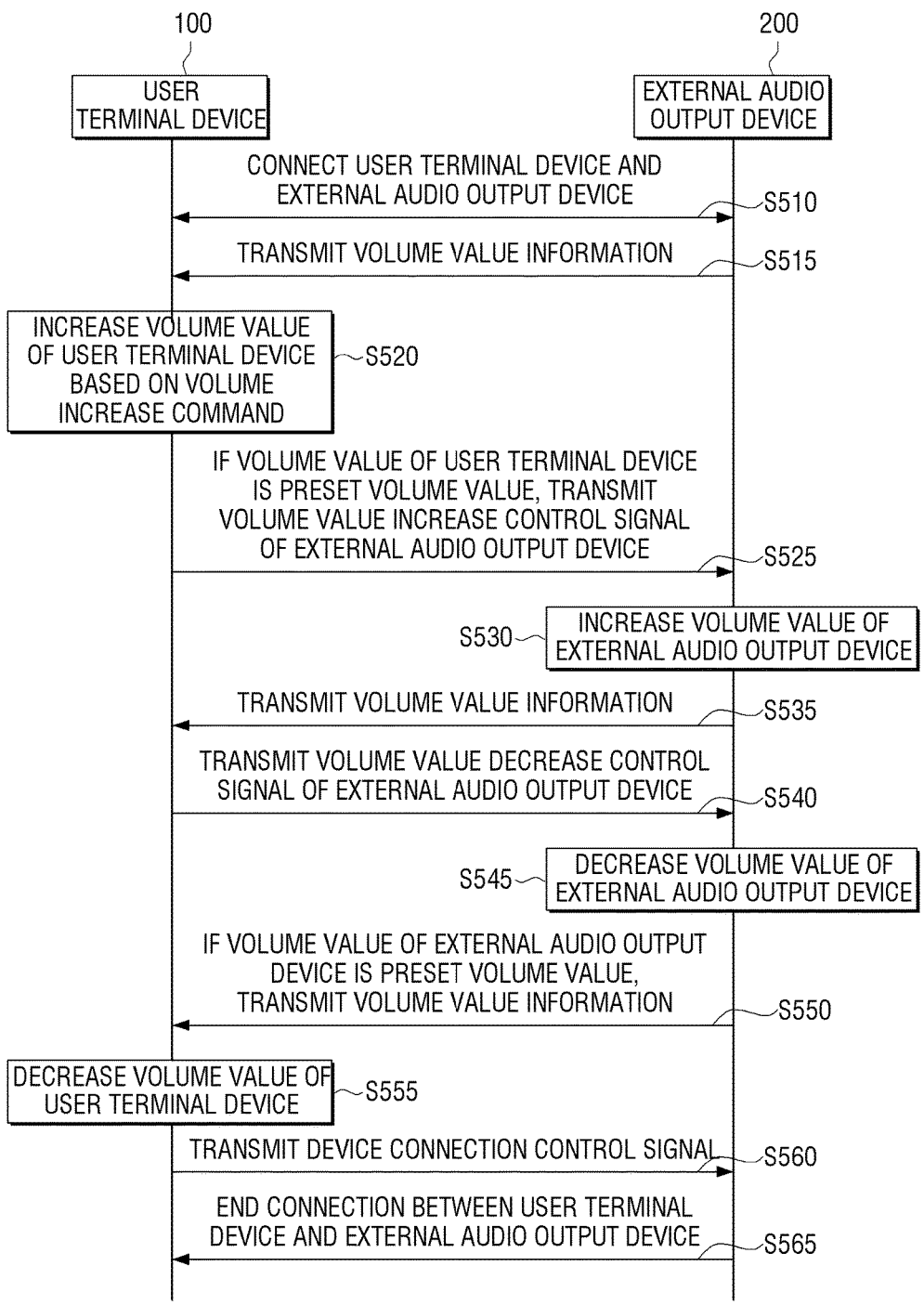

USER TERMINAL DEVICE AND CONTROL METHOD THEREOF

CROSS-REFERENCE TO RELATED APPLICATION

This application is based on and claims priority under 35 U.S.C. § 119 to Korean Patent Application No. 10-2017-0009647, filed on Jan. 20, 2017, in the Korean Intellectual Property Office, the disclosure of which is incorporated by reference herein in its entirety.

BACKGROUND

Field

The present disclosure relates generally to a user terminal device and a control method thereof, and for example, to a method of controlling a volume control device of an external audio output device using a user terminal device.

Description of Related Art

The development of communication technology and smart device-related technology has enabled a user to listen to audio by connecting a user terminal device such as a smartphone to an external audio output device.

For example, a user may listen to audio having higher quality than audio, which is output from a smartphone of the user, through a bluetooth speaker by pairing the smartphone of the user and the bluetooth speaker.

Audio output devices that have been recently released such as a bluetooth speaker and the like may have their own volume control devices. Therefore, a user may control a volume by pairing a corresponding audio output device and a user terminal device and then using a volume control device of the user terminal device and a volume control device of the audio output device.

Here, even if the user raises a volume of the user terminal device to the maximum, the user may not acquire an enough volume desired by the user. In this case, the user may acquire a desired volume by manipulating the audio output device and raising a volume of the audio output device.

Therefore, according to existing technology, a user has trouble directly moving to a place where an audio output device is positioned and then manipulating the audio output device in order to control a volume value of the audio output device.

SUMMARY

Example embodiments of the present disclosure address the above disadvantages and other disadvantages not described above.

The present disclosure provides a method of controlling a volume value of an external audio output device using a user terminal device without directly manipulating the external audio output device.

According to an example aspect of the present disclosure, a method of controlling a user terminal device for changing a state of an external audio output device, includes receiving an input corresponding to a user command for changing state information of the external audio output device, receiving the state information of the external audio output device from the external audio output device, and changing a state of a device, which is to be changed based on the user command, based on state information of the user terminal device and the state information of the external audio output device.

The state information may include volume value information of the user terminal device and the external audio output device, wherein if it is identified to change a volume value of the external audio output device, the method includes transmitting a control signal complying with the user command to the external audio output device.

The transmitting may include, if the user command is a volume increase command, and a volume value of the user terminal device is higher than or equal to a preset volume value of the user terminal device, transmitting a control signal for increasing the volume value of the external audio output device based on the user command.

The changing may include, if the user command is the volume increase command, and the volume value of the user terminal device is lower than the preset volume value, increasing the volume value of the user terminal device based on the user command.

The transmitting may include, if the user command is a volume decrease command, and the volume value of the external audio output device is higher than the preset volume value, transmitting a control signal for decreasing the volume value of the external audio output device based on the user command.

The changing may include, if the user command is the volume decrease command, and the volume value of the external audio output device is lower than or equal to the preset volume value, decreasing the volume value of the user terminal device based on the user command.

The method may further include, if the user terminal device is connected to the external audio output device, storing the state information of the user terminal device and the state information of the external audio output device, wherein if the connection between the user terminal device and the external audio output device ends, the volume value of the user terminal device is changed to a volume value corresponding to the stored state information of the user terminal device.

The method may further include, if a connection end control signal is transmitted to the external audio output device, transmitting a control signal for changing the volume value of the external audio output device to the stored volume value of the external audio output device.

According to another example aspect of the present disclosure, a user terminal device for changing a state of an external audio output device, includes an input unit comprising input circuitry configured to receive an input corresponding a user command for changing state information of the external audio output device, a communicator comprising communication circuitry configured to perform a connection to the external audio output device, and a processor configured to receive the state information of the external audio output device from the external audio output device and to change a state of a device, which is to be changed based on the user command, based on state information of the user terminal device and the state information of the external audio output device.

The state information may include volume value information of the user terminal device and the external audio output device, wherein if the processor identifies to change a volume value of the external audio output device, the communicator transmits a control signal complying with the user command to the external audio output device.

If the user command is a volume increase command, and a volume value of the user terminal device is higher than or equal to a preset volume value, the processor may identify the external audio output device as a device of which a volume value is to be changed according to the user command, and the communicator may increase a volume value of the external audio output device based on the user command.

If the user command is the volume increase command, and the volume value of the user terminal device is lower than the preset volume value, the processor may identify the user terminal device as the device of which the volume value is to be changed according to the user command and increase the volume value of the user terminal device based on the user command.

If the user command is a volume decrease command, and the volume value of the external audio output device is higher than the preset volume value, the processor may identify the external audio output device as the device of which the volume value is to be changed according to the user command, and the communicator may transmit a control signal for decreasing the volume value of the external audio output device based on the user command.

If the user command is the volume decrease command, and the volume value of the external audio output device is lower than or equal to the preset volume value, the processor may identify the user terminal device as the device of which the volume value is to be changed based on the user command and decrease the volume value of the user terminal device based on the user command.

The user terminal device may further include a storage configured to store the state information of the user terminal device and the state information of the external audio output device if the user terminal device is connected to the external audio output device, wherein if the connection between the user terminal device and the external audio output device ends, the volume value of the user terminal device is changed to a volume value corresponding to the stored state information of the user terminal device.

If a connection end control signal is transmitted to the external audio output device, the communicator may transmit a control signal for changing the volume value of the external audio output device to the stored volume value of the external audio output device.

According to another example aspect of the present disclosure, a computer readable recording medium includes a program executing a method of transmitting a control command of a user terminal device, wherein a method of controlling the user terminal device for changing state information of an external audio output device, includes receiving an input corresponding to a user command for changing the state information of the external audio output device, receiving the state information of the external audio output device from the external audio output device, and changing a state of a device, which is to be changed according to the user command, based on state information of the user terminal device and the state information of the external audio output device.

According to various example embodiments of the present disclosure, a volume value of an external audio output device may be controlled using a user terminal device.

Additional and/or other aspects and advantages of the disclosure will be set forth in part in the description which follows and, in part, will be apparent from the description, or may be learned by practice of the disclosure.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein:

FIGS. 3A, 3B, 3C and 3D are flowcharts illustrating several example embodiments of the present disclosure;

FIG. 5 is a sequence diagram illustrating an example operation of a system according to an example embodiment of the present disclosure;

DETAILED DESCRIPTION

Figure 1:
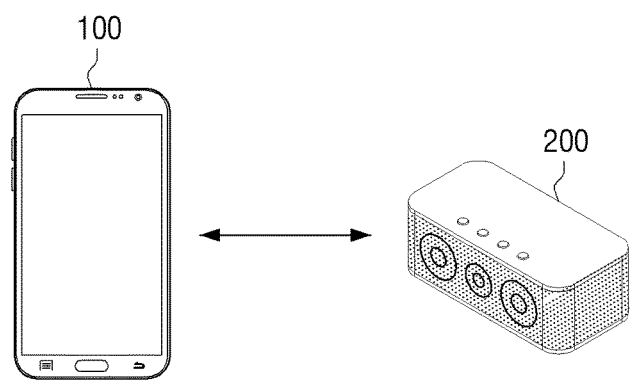
FIG. 1 is a diagram illustrating an example system including a user terminal device and an external audio output device according to an example embodiment of the present disclosure.

Various example embodiments of the present disclosure will now be described in greater detail with reference to the accompanying drawings.

In the following description, same drawing reference numerals are used for the same elements even in different drawings. The matters defined in the description, such as detailed construction and elements, are provided to assist in a comprehensive understanding of the disclosure. Thus, it is apparent that the example embodiments of the present disclosure can be carried out without those specifically defined matters. Also, well-known functions or constructions may not be described in detail if they would obscure the disclosure with unnecessary detail.

The terms used herein will be described in brief, and the present disclosure will be described in detail.

The terms used herein are selected as general terms that are currently widely used in consideration of their functions in the present disclosure. However, this may depend on intentions of those skilled in the art, precedents, emergences of new technologies, or the like. Also, in a particular case, terms may be arbitrarily selected, and detailed meanings of the terms will be described in description parts of example embodiments corresponding to the particular case. Therefore, the terms used herein may be defined based on meanings of the terms and whole contents of the example embodiments not on simple names of the terms.

Example embodiments of the present disclosure may be made into various modifications and may have several types of example embodiments. Therefore, particular example embodiments will be illustrated in the drawings and will be described in detail in the detailed description of the disclosure. However, this is not intended to limit the scope of a particular example embodiment and may be understood as including all changes, equivalents, and alternatives which belong to the spirit and scope of the present disclosure. Detailed descriptions of example embodiments may be omitted if detailed descriptions of related well-known technologies are determined as making the main point of the present disclosure obscure.

Although the terms 'first', 'second', etc. may be used herein to describe various elements regardless of orders and/or importances, these elements may not be limited by these terms. These terms are merely used to distinguish one element from another.

The singular expression also includes the plural meaning as long as it does not differently mean in the context. In the present application, the terms "include" and "comprise" designate the presence of features, numbers, steps, operations, components, elements, or a combination thereof that are written in the disclosure, but do not exclude the presence or possibility of addition of one or more other features, numbers, steps, operations, components, elements, or a combination thereof In the example embodiments of the present disclosure, a "module" or a "part" performs at least one function or operation, and may be implemented with hardware, software, or a combination thereof. In addition, a plurality of "modules" or a plurality of "parts" may be integrated into at least one module, except for a "module" or a "part" which has to be implemented as particular hardware so as to be implemented as at least one processor (not shown).

Also, when any part is "connected to" another part, this includes a "direct connection" and an "electrical connection" through another medium. In addition, it may denote that the any part may be physically and wirelessly connected to the another part. Unless otherwise defined, when any part "includes" any element, it may denote that any part further include other elements without excluding other elements.

Hereinafter, example embodiments of the present disclosure will be described in greater detail with reference to the attached drawings so as to be easily implemented by those skilled in the art to which the present disclosure pertains. However, the present disclosure may be embodied into several different forms and is not limited to example embodiments that will be described herein. Also, parts that are not associated with descriptions will be omitted from the drawings in order to clearly describe the present disclosure, and similar reference numerals will be attached to similar parts throughout the disclosure.

Prior to the description of the drawings, the terms used herein will be first described. The term "volume" used herein refers to a level of a sound that a user may listen to, and the term "volume value" refers to information about volumes of a user terminal device and an audio output device. For example, a volume of an audio output device indicates a level of a sound being output from the audio output device and is determined by a volume value of a user terminal device and a volume value of the audio output device.

By way of non-limiting example and to aid in understanding and description, in order to describe several example embodiments of the present disclosure, a volume value of a user terminal device will be described based on levels from 0 to 15, and a volume value of an audio output device will be described based on levels from 0 to 30. However, the volume values of the user terminal device and the audio output device are not limited thereto and will be described hereinafter with reference to FIGS. 1 through 7.

FIG. 1 is a diagram illustrating an example system including a user terminal device 100 and an external audio output device 200 according to an example embodiment of the present disclosure.

The system according to FIG. 1 may include the user terminal device 100 and the external audio output device 200.

Here, examples of the user terminal device 100 according to the example embodiment of the present disclosure may include, for example, and without limitation, a smartphone, a tablet personal computer (PC), a mobile phone, an image phone, an e-book reader, a desktop PC, a laptop PC, a netbook computer, a workstation, a personal digital assistant (PDA), a portable multimedia player (PMP), or the like.

Also, the external audio output device 200 according to the example embodiment of the present disclosure may be various types of external audio output devices 200. For example, the external audio output device 200 of the present example embodiment may be various types of external audio output devices 200 such as, for example, and without limitation, a floor standing speaker device, a bookshelf speaker device, a satellite speaker device, or the like or may be a device such as an in-ear earphone, a headset, or the like. However, the external audio output device 200 is not limited to the above-mentioned structures, and the present disclosure may be applied to various types of devices capable of outputting audio.

Figure 2A:
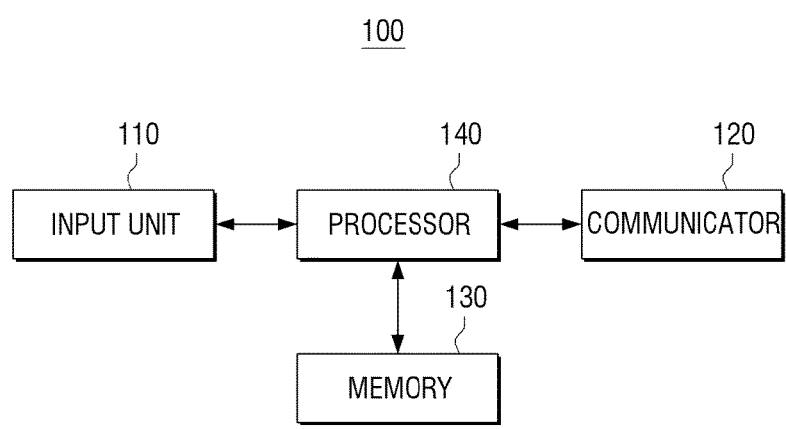
FIGS. 2A and 2B are block diagrams illustrating an example configuration of a user terminal device according to an example embodiment of the present disclosure.
Figure 2B:
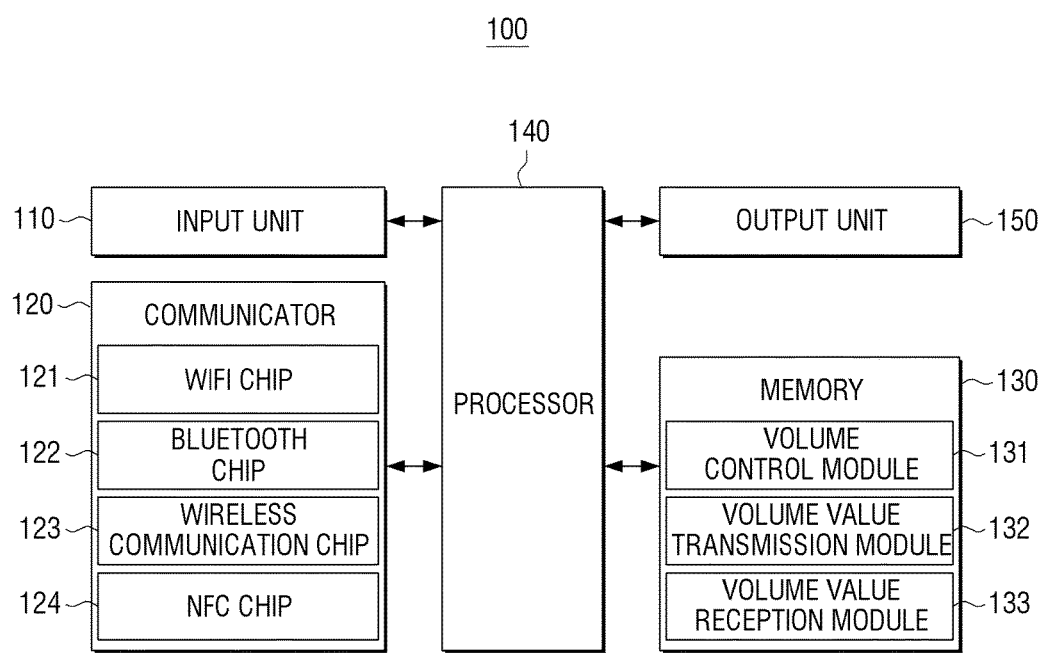

FIGS. 2A and 2B are block diagrams illustrating an example configuration of the user terminal device 100, according to an example embodiment of the present disclosure.

FIG. 2A is a block diagram illustrating a simple example configuration of the user terminal device 100 according to an example embodiment of the present disclosure.

As illustrated in FIG. 2A, the user terminal device 100 includes an input unit (e.g., including input circuitry) 110, a communicator (e.g., including communication circuitry) 120, a memory 130, and a processor (e.g., including processing circuitry) 140.

The input unit 110 may include various input circuitry to receive a user command for changing a volume value of the user terminal device 100 or the external audio output device 200.

For example, the input unit 110 may include various input circuitry such as, for example, and without limitation, a volume control button type included in the user terminal device 100. However, the input unit 110 is not limited to a structure and a function as mentioned above and thus may include various circuitry to receive several kinds of control commands for controlling the user terminal device 100.

The communicator 120 may include various communication circuitry and perform a communication with the external audio output device 200. For example, the communicator 120 may include circuitry to transmit a control command to the external audio output device 200 and may include circuitry to receive current volume value information, maximum volume value information, and preset volume value information of the external audio output device 200.

The memory 130 may store information about the external audio output device 200, wherein the information is received through the communicator 120.

For example, the memory 130 may store volume value information of the user terminal device 100 and volume value information of the external audio output device 200 in a point of time when the user terminal device 100 and the external audio output device 200 are connected to each other. If the processor 140 requests the information of the external audio output device 200 stored in the memory 130, the memory 130 may transmit the corresponding information to the processor 140.

The processor 140 may include various processing circuitry to control an overall operation of the user terminal device 100. For example, the processor 140 may control the communicator 120 to perform pairing so as to be connected to the external audio output device 200.

If the processor 140 is connected to the external audio output device 200, the processor 140 may receive currently set volume value information of the external audio output device 200 from the external audio output device 200 and may determine a device of which a volume value is to be changed according to a user command, based on currently set volume value information of the user terminal device 100 and the currently set volume value information of the external audio output device 200.

According to an example embodiment of the present disclosure, if a user command is a volume increase command, the processor 140 may determine whether a current volume value of the user terminal device 100 is a preset volume value. Here, the preset volume value may be a maximum volume value of the user terminal device 100 but is not limited thereto. For example, the preset volume value may be set according to an optimum output value complying with specifications of the user terminal device 100 or may be variously set according to an output level of the external audio output device 200.

If the current volume value of the user terminal device 100 is the preset volume value, the processor 140 may determine the external audio output device 200 as the device of which the volume value is to be changed according to the user command. Here, the processor 140 may control the communicator 120 to transmit a control command for increasing a volume value of the external audio output device 200 to the external audio output device 200.

On the other hand, if a volume value of the user terminal device 100 is lower than the preset volume value, the processor 140 may determine the user terminal device 100 as the device of which the volume value is to be changed according to the user command. Here, the processor 140 may control the user terminal device 100 to increase the volume value of the user terminal device 100.

According to another example embodiment of the present disclosure, if a user command is a volume decrease command, the processor 140 may determine whether a current volume value of the external audio output device 200 is a preset volume value.

Here, the processor 140 may determine whether the current volume value of the external audio output device 200 is the preset volume value, by updating current volume value information of the external audio output device 200. Therefore, the processor 140 may periodically receive volume value information of the external audio output device 200. The processor 140 may receive the volume value information of the external audio output device 200 whenever the processor 140 transmits a control signal to the external audio output device 200. However, the present disclosure is not limited to this method, and thus volume value information of the external audio output device 200 may be received at preset time intervals or after a volume decrease command of a user is input.

If the current volume value of the external audio output device 200 is higher than the preset volume value, the processor 140 may determine the external audio output device 200 as the device of which the volume value is to be changed according to the user command. Here, the processor 140 may control the communicator 120 to transmit a control command for decreasing a volume value of the external audio output device 200 to the external audio output device 200.

On the other hand, if a current volume value of the user terminal device 100 is the preset volume value, the processor 140 may determine the user terminal device 100 as the device of which the volume value is to be changed according to the user command. Here, the processor 140 may control the user terminal device 100 to decrease a volume value of the user terminal device 100.

According to another example embodiment, as described above, the memory 130 may store current volume value information of the user terminal device 100 and current volume value information of the external audio output device 200 in a point of time when the user terminal device 100 is connected to the external audio output device 200. Here, if the connection to the external audio output device 200 ends, the processor 140 may control the user terminal device 100 to change a volume value of the user terminal device 100 to a volume value of the user terminal device 100 that is stored. In other words, if the connection to the external audio output device 200 ends, the processor 140 may control the user terminal device 100 to reset the user terminal device 100 to a volume value that is set before the user terminal device 100 is connected to the external audio output device 200.

If the processor 140 transmits a connection end signal to the external audio output device 200 in order to end the connection between the user terminal device 100 and the external audio output device 200, the processor 140 may control the communicator 120 to transmit a control signal for changing a volume value of the external audio output device 200 to a volume value of the external audio output device 200 that is stored. In other words, if the connection between the user terminal device 100 and the external audio output device 200 ends, the processor 140 may control the communicator 120 to transmit a control signal for resetting a volume value of the external audio output device 200 to a volume value that is set before the user terminal device 100 and the external audio output device 200 are connected to each other.

FIG. 2B is a block diagram illustrating a more detailed example configuration of the user terminal device 100 according to an example embodiment of the present disclosure.

For example, the user terminal device 100 may further include an output unit (e.g., including output circuitry) 150 besides the input unit 110, the communicator 120, the memory 130, and the processor 140. However, the user terminal device 100 is not limited to this configuration, and thus new elements may be added or omitted.

As described above, the input unit 110 may include various input circuitry to receive various types of inputs besides a user command. For example, the input unit 110 may include various circuitry to receive an input of a volume control button existing in the user terminal device 100 or may be combined with a sensor (not shown) to receive a touch input of a user.

The communicator 120 may include various communication circuitry, such as, for example, and without limitation, at least one selected from a wireless fidelity (WiFi) chip 121, a Bluetooth chip 122, a wireless communication chip 123, and a near field communication (NFC) chip 124. In particular, the WiFi chip 121 and the Bluetooth chip 122 may respectively perform communications according to a WiFi method and a Bluetooth method. If the WiFi chip 121 or the Bluetooth chip 122 is used, various types of information may be transmitted and received by transmitting and receiving various types of connection information such as a subsystem identification (SSID), a session key, and the like and performing a communication connection by using the various types of connection information. The wireless communication chip 123 may refer, for example, to a chip that performs communications according to various types of communication standards such as Institute of Electrical and Electronics Engineers (IEEE), Zigbee, $3^{rd}$ Generation (3G), $3^{rd}$ Generation Partnership Project (3GPP), Long Term Evolution (LTE), and the like. The NFC chip 124 refers to a chip that operates according to an NFC method that uses a band of 13.56 MHz among various types of radio frequency identification (RFID) frequency bands such as 135 kHz, 13.56 MHz, 433 MHz, 860~960 MHz, 2.45 GHz, and the like.

For convenience of description, the present disclosure will be described based on a fact that the user terminal device 100 and the external audio output device 200 are connected to each other according to a Bluetooth method. However, the present disclosure is not limited to this method, and thus the user terminal device 100 and the external audio output device 200 may be connected to each other according to various types of connection methods.

The memory 130 may store an operating system (O/S) for driving the user terminal device 100. The memory 130 may also store various types of software programs or applications for operating the user terminal device 100 according to various example embodiments of the present disclosure. The memory 130 may store various types of information such as various types of data and the like that are input, set, or generated while a program or an application is executed.

In addition, the memory 130 may include various types of software modules for operating the user terminal device 100 according to various example embodiments of the present disclosure. Also, the processor 140 may perform an operation of the user terminal device 100 according to various example embodiments of the present disclosure by executing the various types of software modules stored in the memory 130.

For this, the memory 130 may include a semiconductor memory such as a flash memory or the like, a magnetic storage medium such as a hard disk or the like, or the like.

Also, the memory 130 may further include a volume control module 131, a volume value transmission module 132, and a volume value reception module 133. As noted above, each of these modules may be implemented in software. However, the present disclosure is not limited thereto. For example, the modules may be implemented in processing circuitry and/or program elements (e.g., software). For example, the volume control module 131 may manage volume value information controlled by the processor 140. The volume value transmission module 132 and the volume value reception module 133 may transmit and receive information about a volume value to and from the external audio output device 200.

The output unit 150 may include various output circuitry to output various types of functions that may be performed by the user terminal device 100. For example, the output unit 150 may include various output circuitry, such as, for example, and without limitation, a display capable of outputting image data, a speaker capable of outputting audio data, or the like. However, the present disclosure is not limited to this configuration, and thus new elements may be added or omitted.

FIGS. 3A, 3B, 3C and 3D are flowcharts illustrating several example embodiments of the present disclosure. In order to describe several example embodiments of the present disclosure, a maximum volume value of the user terminal device 100 will be described based on a total of 15 levels, and a maximum volume value of the external audio output device 200 will be described based on a total of 30 levels. Also, in the present disclosure, an initial volume value of the user terminal device 100 will be described based on 7 levels, and an initial volume value of the external audio output device 200 will be described based on 15 levels. However, the present disclosure is not limited to this configuration and thus may be applied to the user terminal device 100 and the audio output device 200 that may have various types of volume values.

FIG. 3A is a flowchart illustrating an example method of increasing a volume of the external audio output device 200 according to an example embodiment of the present disclosure.

In operation S310, a user may input a user command for increasing a volume value of the user terminal device 100. Here, the user command may be pushing of a volume value increase/decrease button included in the user terminal device 100. However, the present disclosure is not limited to this, and thus the user may input a volume value control command by using a user interface (UI) generated on a display included in the user terminal device 100 or may increase a volume value according to various types of user commands like increasing a volume value through a voice command. However, for convenience of description in the present disclosure, a user command will be described based on a case of pushing a volume value increase/decrease button.

If the volume value increase button is pushed, a volume increase command may be transmitted to the processor 140 through the input unit 110, and the processor 140 may increase a volume value of the user terminal device 100 in operation S311.

Whenever the volume value of the user terminal device 100 increases, the processor 140 may determine whether the volume value of the user terminal device 100 is a preset volume value in operation S312. Here, the preset volume value may be a maximum volume value of the user terminal device 100 but is not limited thereto.

If the volume value of the user terminal device 100 is lower than the preset volume value in operation S312, the process may return to operation S311 to continuously increase the volume value of the user terminal device 100.

If the volume increase command is input, and thus the volume value of the user terminal device 100 reaches the preset volume value of the user terminal device 100 in operation S312, the processor 140 may receive a current volume value of the external audio output device 200 through the communicator 120 and store the current volume value in the memory 130 in operation S313. However, the present disclosure is not limited thereto, and thus when the user terminal device 100 and the external audio output device 200 are connected to each other, the processor 140 may receive and store volume value information of the external audio output device 200.

If the volume increase button of the user terminal device 100 is pushed, the processor 140 transmits a control signal for increasing a volume value of the external audio output device 200 to the external audio output device 200 through the communicator 120 in operation S314.

For example, the processor 140 may determine the external audio output device 200 as a device, which increases a volume value for a volume increase, by checking that a volume value of the user terminal device 100 is maximum.

If the volume value of the external audio output device 200 is not maximum in operation S315, the processor 140 continuously transmits a volume increase control signal to the external audio output device 200.

If the volume value of the external audio output device 200 is maximum in operation S315, volume values of the user terminal device 100 and the external audio output device 200 are all maximum, and thus an increase in a volume of the external audio output device 200 ends.

Figure 3B:
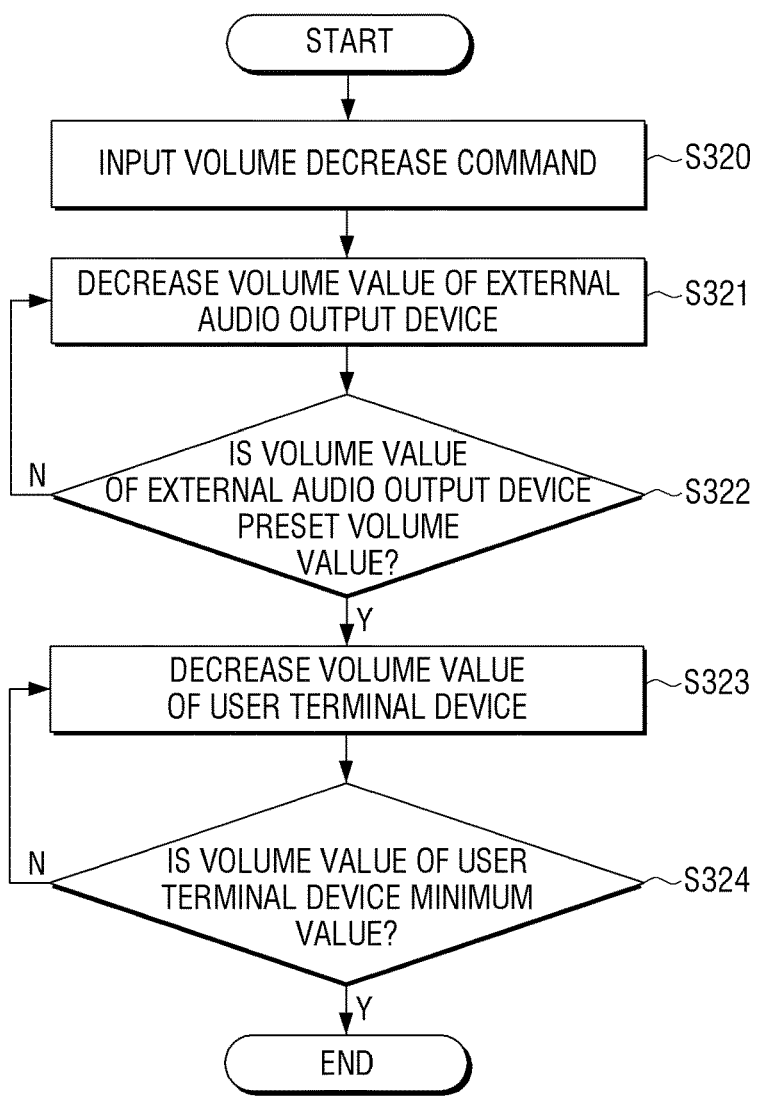

FIG. 3B is a flowchart illustrating an example method of decreasing a volume of the external audio output device 200. For example, FIG. 3B is a flowchart of a method of decreasing a volume of the external audio output device 200 if volume values of the user terminal device 100 and the external audio output device 200 are maximum.

In operation S320, a user may input a user command for decreasing a volume value of the user terminal device 100. If a volume value decrease command is input, the processor 140 transmits a volume value decrease control signal to the external audio output device 200 through the communicator 120 in operation S321. Here, the external audio output device 200 that receives the volume value decrease control signal through the communicator 120 may decrease a volume value thereof and transmit current volume value information thereof to the user terminal device 100.

In operation S322, the processor 140 may determine whether a volume value of the external audio output device 200 is a preset volume value based on the received volume value information of the external audio output device 200. Here, the preset volume value may be a volume value of the external audio output device 200 that is set if the user terminal device 100 and the external audio output device 200 are connected to each other. However, the present disclosure is not limited thereto, and thus the preset volume value may be a volume value set by the user or a volume value determined by various types of methods.

If the volume value of the external audio output device 200 is higher than the preset volume value in operation S322, the processor 140 may control the communicator 120 to transmit a volume value decrease control signal to the external audio output device 200.

If the volume value of the external audio output device 200 is the preset volume value in operation S322, the processor 140 may decrease a volume value of the user terminal device 100 in operation S323.

The processor 140 may determine whether the volume value of the user terminal device 100 is a minimum value. In other words, if the volume value of the user terminal device 100 is not level 0 in operation S324, the processor 140 may continuously decrease the volume value of the user terminal device 100. If the volume value of the user terminal device 100 is level 0 in operation S324, the processor 140 ends volume decreasing.

Figure 3C:
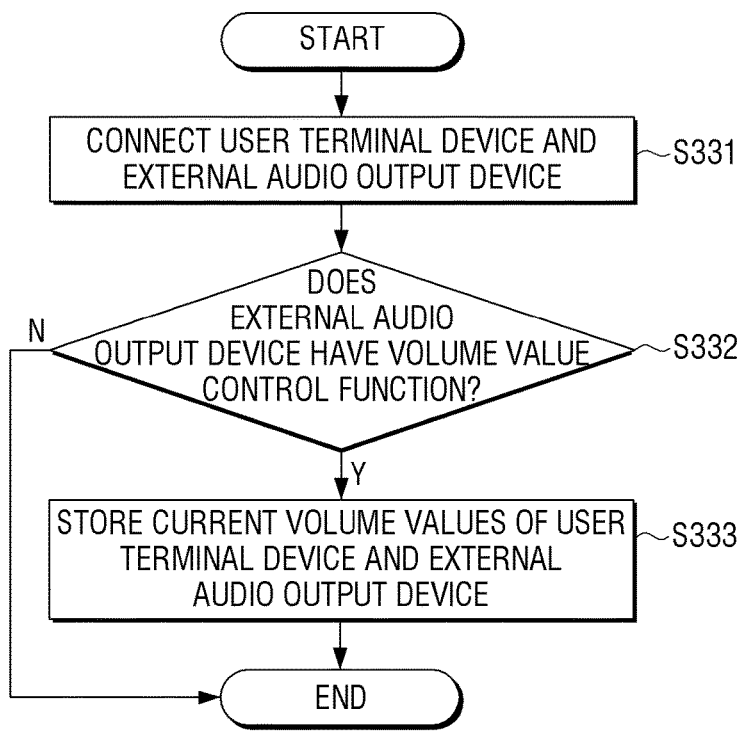

FIG. 3C is a flowchart illustrating an example volume control method according to another example embodiment of the present disclosure. For example, the processor 140 may determine whether the external audio output device 200 has a volume value control function before controlling a volume.

In operation S331, the user terminal device 100 and the external audio output device 200 may be connected to each other through pairing. However, as described above, the user terminal device 100 and the external audio output device 200 may be connected to each other according to various methods.

If the user terminal device 100 and the external audio output device 200 are connected to each other, the processor 140 may determine whether the external audio output device 200 is a device capable of performing a volume value control function in operation S332. If the external audio output device 200 does not have the volume value control function in operation S332, the processor 140 may control merely a volume value of the user terminal device 100.

If the external audio output device 200 has the volume value control function in operation S332, the processor 140 may control the memory 130 to store current volume value information of the user terminal device 100 and current volume value information of the external audio output device 200 in operation S333.

As described with reference to FIG. 3B, the processor 140 may control the communicator 120 to change a volume value of the user terminal device 100 or transmit a control signal for changing a volume value of the external audio output device 200 in response to pushing of a volume value increase or decrease button.

Figure 3D:
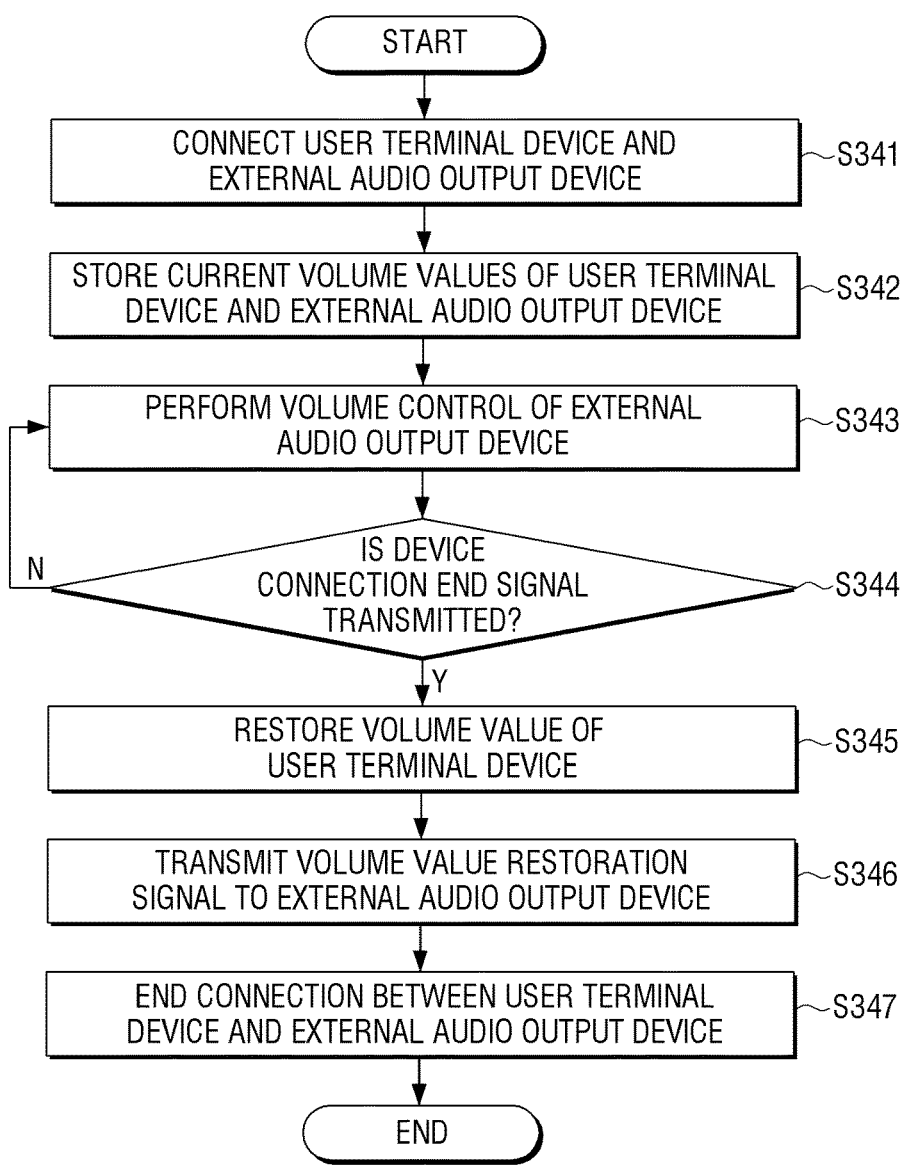

FIG. 3D is a flowchart illustrating an example method of resetting a volume value when a connection between the user terminal device 100 and the external audio output device 200 ends, according to another example embodiment of the present disclosure.

In operation S341, the user terminal device 100 and the external audio output device 200 may be connected to each other through pairing. However, as described above, the user terminal device 100 and the external audio output device 200 may be connected to each other according to various methods.

If the user terminal device 100 and the external audio output device 200 are connected to each other, the processor 140 may control the memory 130 to store a current volume value of the user terminal device 100 and a current volume value of the external audio output device 200 in operation S342. Although not shown in the flowchart of FIG. 3D, volume value information of the external audio output device 200 may be transmitted to the user terminal device 100 if the user terminal device 100 and the external audio output device 200 are connected to each other.

After storing the volume value, the processor 140 may control a volume of the external audio output device 200 in operation S343 according to an example embodiment of the present disclosure. As described above, the processor 140 may determine whether a device of which a volume value is to be changed is the user terminal device 100 or the external audio output device 200. If the device of which the volume value is to be changed is the user terminal device 100, the processor 140 may change a volume value of the user terminal device 100. If the device of which the volume value is to be changed is the external audio output device 200, the processor 140 may control the communicator 120 to transmit a control signal for changing a volume value of the external audio output device 200.

If a user ends using the external audio output device 200 and ends the connection between the user terminal device 100 and the external audio output device 200, the processor 140 may transmit a control signal for ending the connection to the external audio output device 200 in operation S344.

If the signal for ending the connection between the user terminal device 100 and the external audio output device 200 is not transmitted in operation S344, the processor 140 may continuously change the volume of the external audio output device 200 based on a user command.

If the signal for ending the connection between the user terminal device 100 and the external audio output device 200 is transmitted in operation S344, the processor 140 may reset (e.g., restore) a volume value of the user terminal device 100 to a volume value that is set before the user terminal device 100 and the external audio output device 200 are connected to each other in operation S345. For example, if the signal for ending the connection between the user terminal device 100 and the external audio output device 200 is transmitted, the processor 140 may change the volume value of the user terminal device 100 to a volume value of the user terminal device 100 that is stored when the user terminal device 100 and the external audio output device 200 are connected to each other.

Similarly, the processor 140 may control the communicator 120 to transmit a control signal for resetting a volume value of the external audio output device 200 in operation S346. In other words, if the signal for ending the connection between the user terminal device 100 and the external audio output device 200 is transmitted, the processor 140 may control the communicator 120 to transmit a control signal for changing a volume value of the external audio output device 200 to a volume value of the external audio output device 200 that is stored when the user terminal device 100 and the external audio output device 200 are connected to each other.

In other words, if the connection between the user terminal device 100 and the external audio output device 200 ends, the external audio output device 200 may receive a connection end control signal and a volume value restoration control signal from the user terminal device 100. If the external audio output device 200 receives the connection end control signal, the connection between the user terminal device 100 and the external audio output device 200 ends in operation S347.

Figure 4A:
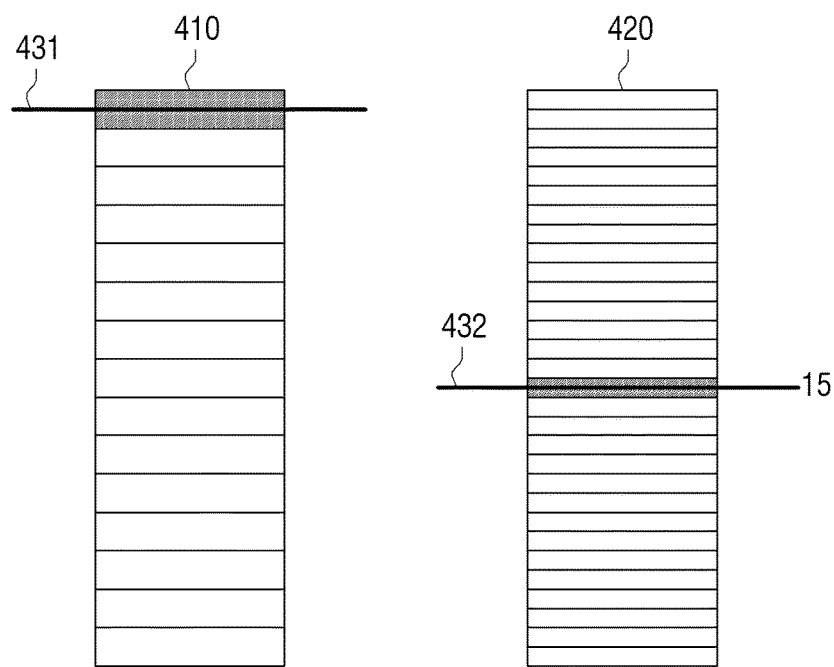
FIGS. 4A and 4B are diagrams illustrating an example method of controlling a volume according to an example embodiment of the present disclosure.
Figure 4B:
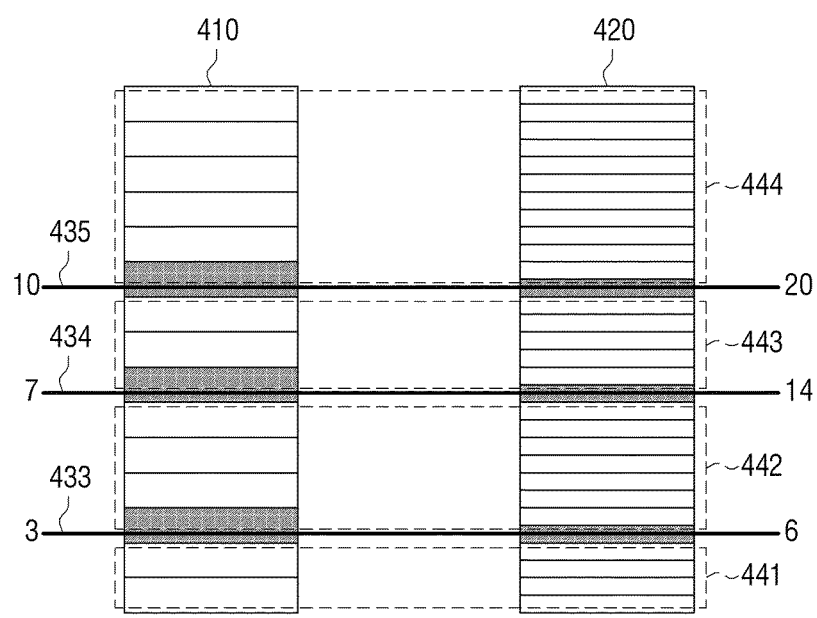

FIGS. 4A and 4B are diagrams illustrating an example volume control method according to an example embodiment of the present disclosure.

Referring to FIGS. 4A and 4B, bars that are formed in a vertical direction respectively denote a volume value bar 410 of the user terminal device 100 and a volume value bar 420 of the external audio output device 200. For convenience of description, the volume value bar 410 of the user terminal device 100 is referred to as a first volume value bar 410, and the volume value bar 420 of the external audio output device 200 is referred to as a second volume value bar 420. As described above, in the present disclosure, a volume value of the user terminal device 100 will be described as being set from level 0 to level 15, and a volume value of the external audio output device 200 will be described as being set from level 0 to level 30. However, the present disclosure is not limited thereto, and thus the user terminal device 100 and the external audio output device 200 may have various volume values.

Lines 431, 432, 433, 434, and 435 that are formed in a horizontal direction denote preset volume value levels. Hereinafter, horizontal lines illustrated in FIGS. 4A and 4B will be described as volume value setting lines. A method of changing a volume of the external audio output device 200 may be changed based on the volume value setting lines. Hereinafter, FIGS. 4A and 4B will be described in greater detail.

FIG. 4A illustrates the volume control method described with reference to FIG. 3A, 3B, 3C, or 3D. The first volume value bar 410, the second volume value bar 420, the first volume value setting line 431, and the second volume value setting line 432 may be illustrated in FIG. 4A.

As described with reference to FIGS. 3A through 3D, if a volume of the external audio output device 200 is to increase, and a volume value of the user terminal device 100 is not level 15, the processor 140 may increase the volume value of the user terminal device 100. If the volume value of the user terminal device 100 is maximum, the processor 140 may control the communicator 120 to transmit a volume value increase control signal to the external audio output device 200. In other words, if the volume of the external audio output device 200 is to increase, the processor 140 may determine a device controlling a volume value based on the first volume value setting line 431.

If the volume of the external audio output device 200 is to decrease, and a volume value of the external audio output device 200 is higher than the second volume value setting line 432, the processor 140 may control the communicator 120 to transmit a volume value decrease control signal to the external audio output device 200. If the volume value of the external audio output device 200 decreases to the second volume value setting line 432, the processor 140 may decrease the volume value of the user terminal device 100.

Here, the second volume value setting line 432 may be positioned on volume value level 15 of the external audio output device 200. However, the second volume value setting line 432 is not limited thereto and thus may be positioned on various volume values. Also, a volume value level corresponding to the second volume value setting line 432 may be a preset volume value but may be a volume value set by the user.

FIG. 4B illustrates a volume control method according to another example embodiment of the present disclosure.

The first volume value bar 410, the second volume value bar 420, and a third volume value setting line 433, a fourth volume value setting line 434, and a fifth volume value setting 435 are illustrated in FIG. 4B. Here, the third volume value setting line 433 may be a line that passes level 3 of the first volume value bar 410 and level 6 of the second volume value bar 420, the fourth volume value setting line 434 may be a line that passes level 7 of the first volume value bar 410 and level 14 of the second volume value bar 420, and the fifth volume value setting line 435 may be a line that passes level 10 of the first volume value bar 410 and level 20 of the second volume value bar 420.

However, the present disclosure is not limited to the above-described contents, and thus various volume value levels may be set. Also, for convenience of description in FIG. 4B, the third through fifth volume value setting lines 433 through 435 divide the first volume value bar 410 and the second volume value bar 420 according to ratios but are not limited thereto. In other words, the first volume value bar 410 and the second volume value bar 420 may independently have volume value setting lines.

Referring to FIG. 4B, the first volume value bar 410 and the second volume value bar 420 may be divided into a first area 441, a second area 442, a third area 443, and a fourth area 444 by three volume value setting lines. Here, in the first volume value bar 410, the first area 441 may be divided into levels from 0 to 3, the second area 442 may be divided into levels from 3 to 7, the third area 443 may be divided into levels from 7 to 10, and the fourth area 44 may be divided into levels from 10 to 15. In other words, volume values at a point where the first volume value bar 410 and the third, fourth, and fifth volume value setting lines 433, 434, and 435 intersect may be included in all of adjacent areas. However, the present disclosure is not limited thereto, and thus the volume values at the point where the volume value bar 410 and the third, fourth, and fifth volume value setting lines 433, 434, and 435 intersect may be included in merely one of an upper area and a lower area.

If the user terminal device 100 and the external audio output device 200 are connected to each other, volume values of the user terminal device 100 and the external audio output device 200 may be arbitrary values. In other words, the volume values of the user terminal device 100 and the external audio output device 200 may be volume values that are previously used.

Here, if the user wants to increase a volume of the external audio output device 200, the processor 140 may first increase a volume value of a device positioned in a lower area among the user terminal device 100 and the external audio output device 200. In contrast, if the user wants to decrease the volume of the external audio output device 200, the processor 140 may first decrease a volume value of a device positioned in a higher area among the user terminal device 100 and the external audio output device 200.

If the volume value of the user terminal device 100 and the volume value of the external audio output device 200 exist in the same area, the processor 140 may first change the volume value of the user terminal device 100. However, the present disclosure is not limited to these example embodiments, and thus the processor 140 may first change the volume value of the external audio output device 200. Also, the processor 140 may determine one of the user terminal device 100 and the external audio output device 200, of which a volume value is to be changed, by comparing levels of volume values.

If a volume value is changed by the above-described method, a volume value level of at least one of the user terminal device 100 or the external audio output device 200 may reach a volume value setting line. In this case, the processor 140 may redetermine whether a volume value of which one of the user terminal device 100 and the external audio output device 200 is to be changed, based on a changed area.

For example, if the user terminal device 100 and the external audio output device 200 are connected to each other, a volume value of the user terminal device 100 may be positioned in the second area 442, and a volume value of the external audio output device 200 may be positioned in the third area 443.

Here, if the user wants to increase a volume of the external audio output device 200, the processor 140 may first increase a volume value of the user terminal device 100 positioned in a lower area.

If a volume value of the user terminal device 100 is level 7, the processor 140 may redetermine an area where volume values of the user terminal device 100 and the external audio output device 200 are positioned. In this case, since both of the volume value of the user terminal device 100 and the volume value of the external audio output device 200 are positioned in the third area 443, the processor 140 may increase the volume value of the user terminal device 100.

If the volume value of the user terminal device 100 is level 10, the processor 140 may redetermine an area where the volume values of the user terminal device 100 and the external audio output device 200 are positioned. In this case, since the volume value of the user terminal device 100 is positioned in the fourth area 444, and the volume value of the external audio output device 200 is positioned in the third area 443, the processor 140 may control the communicator 120 to transmit a control signal for increasing the volume value of the external audio output device 200.

Even if the volume value of the external audio output device 200 is to decrease, the same method may be applied. In other words, the processor 140 may control the communicator 120 to transmit a control signal for decreasing the volume value of the external audio output device 200 until the volume value of the external audio output device 200 becomes level 14.

If the volume value of the external audio output device 200 becomes level 14, both of the volume value of the user terminal device 100 and the volume value of the external audio output device 200 are positioned in the second area 442. Therefore, the processor 140 may decrease the volume value of the user terminal device 100.

As a result, a volume value of the user terminal device 100 or a volume value of the external audio output device 200 may be redetermined based on a point of time when the volume value of the user terminal device 100 or the external audio output device 200 reaches the third, fourth, and fifth volume value setting lines 433, 434, and 435.

The volume value setting lines 433, 434, and 435 have been described as three with reference to FIG. 4B but are not limited thereto. Also, volume value setting lines may be predesignated but may be changed according to settings of the user or the number of volume value setting lines of the user terminal device 100 may be different from the number of volume value setting lines of the external audio output device 200. For example, the user terminal device 100 may have 15 volume value setting lines, and the external audio output device 200 may have 30 volume value setting lines. In this case, if the user pushes a volume control button, a volume value of the user terminal device 100 and a volume value of the external audio output device 200 may alternately increase one by one.

FIG. 5 is a sequence diagram illustrating an example operation of a system according to an example embodiment of the present disclosure.

In operation S510, the user terminal device 100 may be connected to the external audio output device 200 in order to use the external audio output device 200.

If the user terminal device 100 and the external audio output device 200 are connected to each other, the external audio output device 200 may transmit current volume value information thereof to the user terminal device 100 in operation S515. However, as described above, the external audio output device 200 may transmit volume value information in various cases and various situations. For example, the external audio output device 200 may transmit volume value information whenever a volume of the external audio output device 200 is changed due to a change in a volume value of the user terminal device 100 or the external audio output device 200 or may transmit the volume value information at preset time intervals.

If the user terminal device 100 and the external audio output device 200 are connected to each other, a volume of the external audio output device 200 may be changed. FIG. 5 illustrates a case where the volume of the external audio output device 200 increases to a maximum value and then decreases. However, an order of an increase and a decrease in the volume of the external audio output device 200 may be free. In other words, the volume of the external audio output device 200 may decrease and then increase or an increase and a decrease in the volume of the external audio output device 200 may be repeatedly made.

According to the above-described several example embodiments, a volume value of the user terminal device 100 increases based on a volume increase command in operation S520. If the volume value of the user terminal device 100 becomes a preset volume, the user terminal device 100 may transmit a control signal for increasing a volume value of the external audio output device 200 in operation S525.

If the external audio output device 200 receives a volume value increase control signal from the user terminal device 100, the external audio output device 200 increases a volume value thereof in operation S530. Here, in operation S535, the external audio output device 200 may transmit current volume value information thereof to the user terminal device 100 whenever a volume value thereof is changed.

If the external audio output device 200 receives a volume value decrease control signal from the user terminal 100 in operation S540, the external audio output device 200 decreases a volume value thereof in operation S545.

If the volume value of the external audio output device 200 decreases and then reaches a preset volume value, the external audio output device 200 may transmit volume value information thereof to the user terminal device 100 in operation S550. The user terminal device 100 stops transmitting the volume value control signal to the external audio output device 200 and decreases a volume value thereof in operation S555.

If the connection between the user terminal device 100 and the external audio output device 200 is to end, the user terminal device 100 may transmit a device connection control signal to the external audio output device 200 in operation S560, and the connection between the user terminal device 100 and the external audio output device 200 ends in operation S565. Here, as described above, a signal, which is to restore a volume value set before the user terminal device 100 and the external audio output device 200 are connected to each other, may be transmitted together.

Figure 6A:
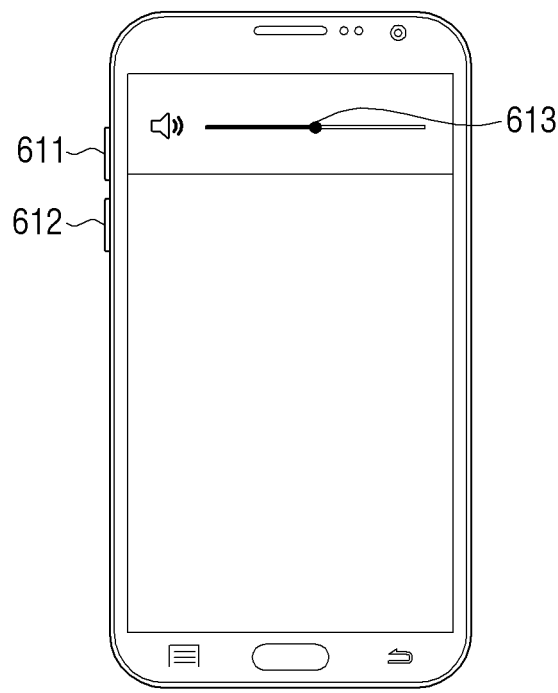
FIGS. 6A, 6B and 6C are diagrams illustrating various example embodiments of the present disclosure.
Figure 6B:
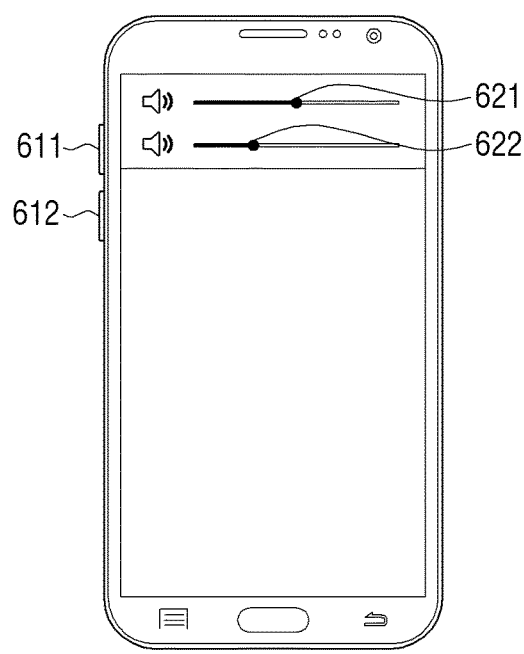
Figure 6C:
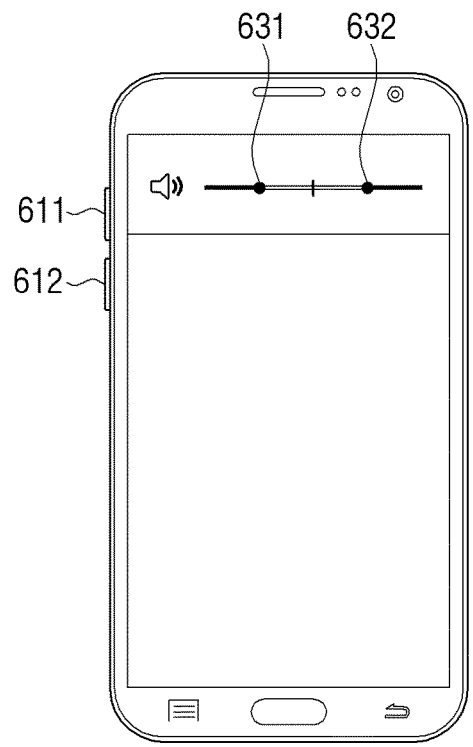

FIGS. 6A, 6B and 6C illustrate various example embodiments of the present disclosure.

For example, FIGS. 6A, 6B and 6C illustrate a method of inputting a user command through the user terminal device 100 in order to control a volume of the external audio output device 200.

As illustrated in FIG. 6A, a volume of the external audio output device 200 may be controlled through volume control buttons 611 and 612 included in the user terminal device 100. For example, volume control buttons may include a volume increase button 611 and a volume decrease button 612.

If a user pushes the volume control buttons 611 and 612, a volume control UI 613 that indicates a current level of a volume of the external audio output device 200 may be generated on a display unit. Here, one volume control UI 613 may include both of a volume value of the user terminal device 100 and a volume value of the external audio output device 200. For example, if the user controls the volume of the external audio output device 200 using the volume control UI 613, the processor 140 may change the volume values of the user terminal device 100 and the external audio output device 200 according to the above-described several methods.

As illustrated in FIG. 6B, if the user pushes the volume control buttons 611 and 612, a UI 621 indicating a current volume value of the user terminal device 100 and a UI 622 indicating a current volume value of the external audio output device 200 may be separately displayed on the display unit. In this case, if the user pushes the volume control buttons 611 and 612, the processor 140 may change volume values of the user terminal device 100 and the external audio output device 200 according to the above-described several methods. Also, if the user changes a volume of the external audio output device 200 using the volume control UIs 621 and 622, the volume value of the user terminal device 100 and the volume value of the external audio output device 200 may be changed in response to an input of the user. In other words, if the user changes a volume of the external audio output device 200 by using a volume control UI, a volume value of the user terminal device 100 and a volume value of the external audio output device 200 may be changed according to settings of the user.

In addition, for convenience of the user, as illustrated in FIG. 6C, a UI 631 indicating a volume value of the user terminal device 100 and a UI 632 indicating a volume value of the external audio output device 200 may be both included on one line.

Figure 7:
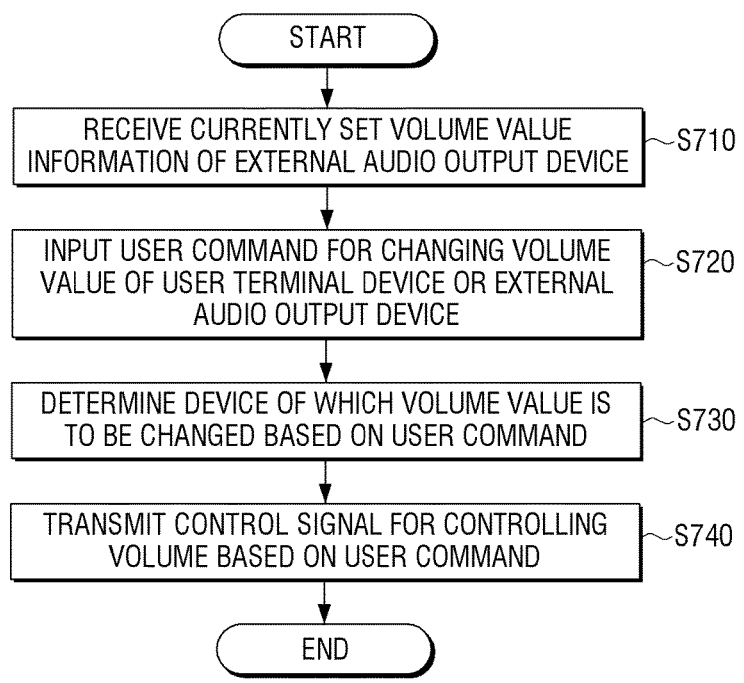
FIG. 7 is a flowchart illustrating an example method of controlling a user terminal device according to an example embodiment of the present disclosure.

FIG. 7 is a flowchart illustrating an example method of controlling a user terminal device according to an example embodiment of the present disclosure.

If the user terminal device 100 and the external audio output device 200 are connected to each other, the user terminal device 100 may receive a currently set volume value of the external audio output device 200 in operation S710. The received volume value may be used to determine a volume value of the external audio output device 200 and may be used to restore the volume value of the external audio output device 200 to a volume value set before the user terminal device 100 and the external audio output device 200 are connected to each other if the connection between the user terminal device 100 and the external audio output device 200 ends.

If the user terminal device 100 and the external audio output device 200 are connected to each other, the processor 140 may receive an input of a user command for changing the volume value of the user terminal device 100 or the volume value of the external audio output device 200 in operation S720.

In operation S730, the processor 140 may determine a device of which the volume value is to be changed based on the user command. In detail, if the user command is a volume increase command, and the volume value of the user terminal device 100 is lower than a preset volume value, the processor 140 may determine the user terminal device 100 as the device of which the volume value is to be changed. Also, if the user command is a volume decrease command, and the volume value of the external audio output device 200 is the preset volume value, the processor 140 may determine the user terminal device 100 as the device of which the volume value is to be changed.

If the user command is the volume increase command, and the volume value of the user terminal device 100 is the preset volume value, the processor 140 may determine the external audio output device 200 as the device of which the volume value is to be changed. Also, if the user command is the volume decrease command, and the volume value of the external audio output device 200 is higher than the preset volume value, the processor 140 may determine the external audio output device 200 as the device of which the volume value is to be changed.

If the device of which the volume value is to be changed is the external audio output device 200, the processor 140 may control the communicator 120 to transmit a control signal for a volume control based on the user command to the external audio output device 200 in operation S740.

Figure 8A:
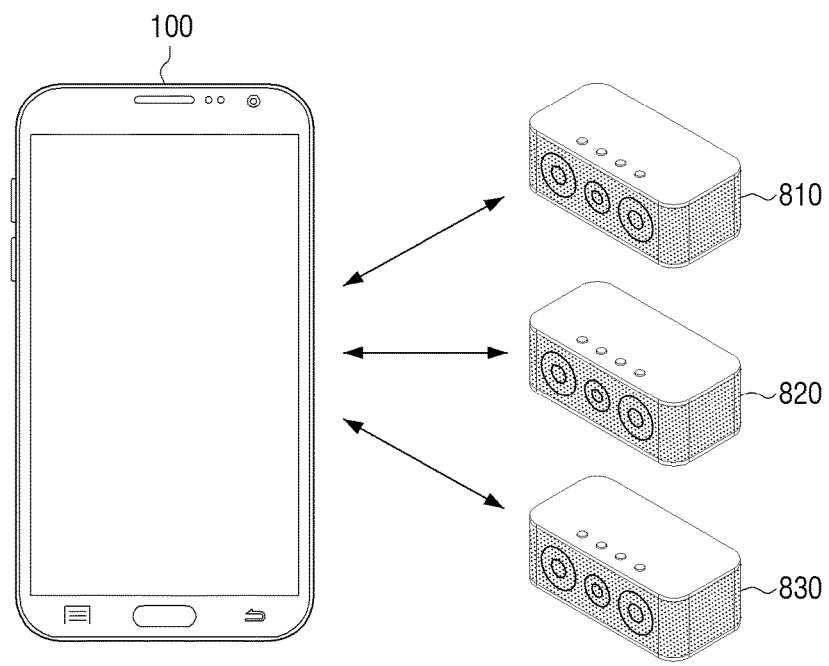
FIGS. 8A and 8B are diagrams illustrating an example method of controlling volumes of a plurality of external audio output devices according to an example embodiment of the present disclosure.
Figure 8B:
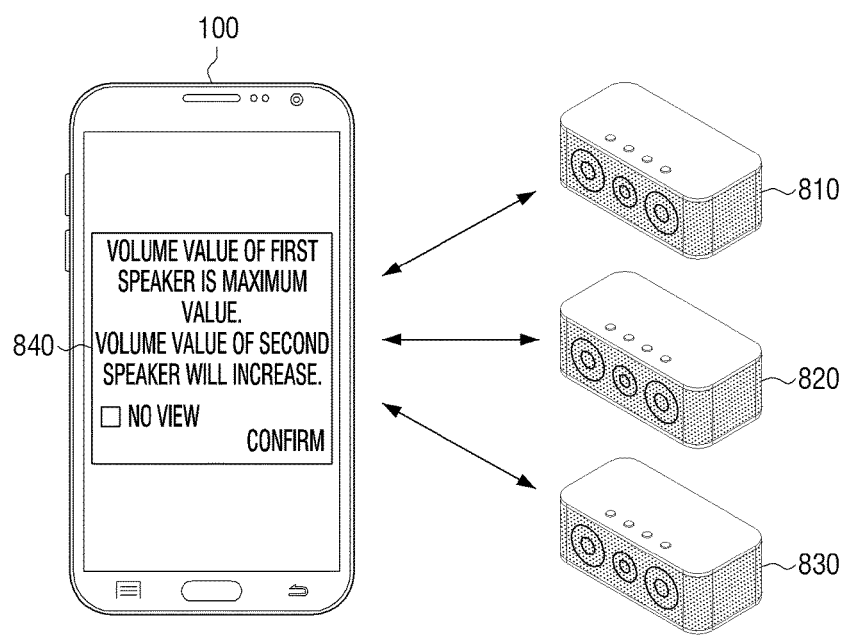

FIGS. 8A and 8B illustrate an example method of controlling volumes of a plurality of external audio output devices according to an example embodiment of the present disclosure.

One external audio output device has been described as being connected to a user terminal device with reference to FIGS. 3A through 7 but are not limited thereto. Therefore, volumes of a plurality of external audio output devices may be controlled. FIG. 8A illustrates first, second, and third external audio output devices 810, 820, and 830 that are connected to the user terminal device 100. However, the number of external audio output devices that are connected to the user terminal device 100 may be diverse.

If a volume increase command is input through the input unit 110, and a volume value of the user terminal device 100 is lower than a preset volume value, the processor 140 may determine the user terminal device 100 as a device of which a volume value is to be changed and may increase the volume value of the user terminal device 100. Here, the first through third external audio output devices 810 through 830 may respectively increase their volume values in response to the increase in the volume value of the user terminal device 100.

If the volume value of the user terminal device 100 is higher than or equal to the preset volume value, a volume of an external audio output device may be changed according to various methods.

According to an example embodiment, volume values of external audio output devices may be changed according to orders of the external audio output devices being connected to the user terminal device 100. For example, if the first through third external audio output devices 810 through 830 are sequentially connected to the user terminal device 100, and a volume increase command is input through the input unit 110, the processor 140 may control the communicator 120 to transmit a control signal for changing a volume value of the first external audio output device 810. Here, if the volume value of the first external audio output device 810 becomes maximum, the processor 140 may control the communicator 120 to transmit a control signal for changing a volume value of the second external audio output device 820. Similarly, if the volume value of the second external audio output device 820 becomes maximum, the processor 140 may control the communicator 120 to transmit a control signal for changing a volume value of the third external audio output device 830. Here, as shown in FIG. 8B, if a volume value of one of a plurality of external audio output devices is maximum, the user terminal device 100 may display a UI 840 for informing a user that a volume of the external audio output device is maximum.

According to another example embodiment, the processor 140 may increase volume values of external audio output devices alternately in connection orders of the external audio output devices. In other words, if the volume increase command is input through the input unit 110, the processor 140 may control the communicator 120 to alternately transmit the control signals for changing the volume values of the first through third external audio output devices 810 through 830. For example, if the volume increase command is input four times, the processor 140 may control the communicator 120 to transmit a control signal for changing the volume values of the first, second, and third external audio output devices 810, 820, and 830 one by one and re-changing the volume value of the first external audio output device 810.

Here, when a volume increase control signal is transmitted once, a volume value of an external audio output device may be changed according to various methods. For example, if a maximum volume value of the first external audio output device 810 is level 10, a maximum value of the second external audio output device 820 is level 20, and a maximum volume value of the third external audio output device 830 is level 30, the plurality of external audio output devices 810, 820, and 830 may increase their volume values by 1 level whenever receiving a volume increase control signal once.

Alternatively, volume values may be changed according to maximum volume value ratios of speakers. For example, the first external audio output device 810 may increase a volume value by 1 level per one-time transmission of the volume increase control signal, the second external audio output device 820 may increase a volume value by 2 levels per one-time transmission of the volume increase control signal, and the third external audio output device 830 may increase a volume value by 3 levels per one-time transmission of the volume increase control signal. However, the present disclosure is not limited thereto, and thus volume values of a plurality of external audio output devices may be changed according to various methods.

If a volume decrease command is input through the input unit 110, and the volume values of the first, second, and third external audio output devices 810, 820, and 830 are lower than or equal to a preset volume value, the processor 140 may determine the user terminal device 100 as the device of which the volume value is to be changed and increase a volume value of the user terminal device 100. Here, the first through third external audio output devices 810 through 830 may respectively decrease their volumes in response to a decrease in a volume value of the user terminal device 100.

If the volume decrease command is input through the input unit 110, and a volume value of at least one of the plurality of external audio output devices 810, 820, and 830 is higher than the preset volume value, the processor 140 may control the communicator 120 to transmit a control signal for changing the volume value of the at least one external audio output device.

Here, if the volume values of the plurality of external audio output devices 810, 820, and 830 may decrease according to an opposite method to the above-described method of increasing the volume values of the plurality of external audio output devices 810, 820, and 830. In other words, the volume values of the plurality of external audio output devices 810, 820, and 830 may decrease one by one or alternatively.

The method of controlling the plurality of external audio output devices 810, 820, and 830 described with reference to FIG. 8A is not limited to the contents described with reference to FIG. 8A. Therefore, even if the plurality of external audio output devices 810, 820, and 830 are connected to the user terminal device 100, the technical spirit described with reference to FIGS. 3A through 7 may also be applied.

The above-described methods may be embodied as program commands that may be executed through various types of computer means and then may be recorded on a computer readable medium. The computer readable medium may include a program command, a data file, a data structure, or a combination thereof. The program command recorded on the computer readable medium may be designed and configured particularly for the present disclosure or may be well known to and used by those skilled in the field of computer software. Examples of the computer readable medium may include magnetic media such as a hard disk, a floppy disk, and a magnetic tape, optical media such as a CD-ROM and a DVD, magneto-optical media such as a floptical disk, and a hardware device that is particularly configured so as to store and execute a program command like a ROM, RAM, a flash memory, or the like. Examples of the program command include a machine language code that may be made by a compiler and a high-level language code that may be executed by a computer by using an interpreter or the like. The hardware device may be configured to operate as at least one or more software modules in order to perform an operation of the present disclosure, and an opposite case is possible.

The foregoing example embodiments and advantages are merely examples and are not to be construed as limiting the present disclosure. The present disclosure can be readily applied to other types of apparatuses. Also, the description of the example embodiments of the present disclosure is intended to be illustrative, and not to limit the scope of the claims, and many alternatives, modifications, and variations will be apparent to those skilled in the art.

What is claimed is:

1. A control method of a user terminal device, the method comprising:
   transmitting a sound to an external output device;
   based on a user command for changing a volume of the sound output from the external audio output device being received, receiving a first volume value of the external audio output device from the external audio output device;
   identifying one of the first volume value and a second volume value of the user terminal device based on the user command; and
   changing one of the first volume value and the second volume value based on the identified volume value.

2. The method of claim 1, further comprising transmitting a control signal complying with the user command to the external audio output device if the first volume value is to be changed.

3. The method of claim 2, wherein:
   the transmitting comprises if the user command is a volume increase command, and the second volume value is higher than or equal to a preset volume value of the user terminal device, transmitting a control signal for increasing the first volume value based on the user command.

4. The method of claim 3, wherein the changing comprises, if the user command is the volume increase command, and the second volume value is lower than the preset volume value, increasing the second volume value based on the user command.

5. The method of claim 2, wherein:
   the transmitting comprises, if the user command is a volume decrease command, and the first volume value is higher than a preset volume value, transmitting a control signal for decreasing the first volume value based on the user command.

6. The method of claim 5, wherein the changing comprises, if the user command is the volume decrease command, and the first volume value is lower than or equal to the preset volume value, decreasing the second volume value based on the user command.

7. The method of claim 2,
   wherein if a connection between the user terminal device and the external audio output device ends, the second volume value is changed to a volume value of the user terminal device before the user terminal device is connected to the external audio output device.

8. The method of claim 7, further comprising:
   transmitting a control signal for changing the first volume value to a volume value of the external audio output device before the user terminal device is connected to the external audio output device if a connection end control signal is transmitted to the external audio output device.

9. A user terminal device comprising:
   an input unit comprising input circuitry;
   a communicator comprising communication circuitry; and
   a processor configured to:
   control the communicator to transmit a sound to an external audio output device,
   based on a user command for changing a volume of the sound output from the external audio output device being received, control the communicator to receive a first volume value of the external audio output device from the external audio output device,
   identify one of the first volume value and a second volume value of the user terminal device based on the user command, and
   change one of the first volume value and the second volume value, based on the identified volume value.

10. The user terminal device of claim 9,
    wherein the processor is configured to control the communicator to transmit a control signal complying with the user command to the external audio output device if the processor determines to change the first volume value.

11. The user terminal device of claim 10, wherein if the user command is a volume increase command, and the second volume value is higher than or equal to a preset volume value, the processor is configured to identify the external audio output device as a device of which the first volume value is to be changed based on the user command, and to control the communicator to increase the first volume value based on the user command.

12. The user terminal device of claim 11, wherein if the user command is the volume increase command, and the second volume value is lower than the preset volume value, the processor is configured to identify the user terminal device as the device of which the second volume value is to be changed based on the user command and to increase the second volume value based on the user command.

13. The user terminal device of claim 10, wherein if the user command is a volume decrease command, and the first volume value is higher than a preset volume value, the processor is configured to identify the external audio output device as the device of which the first volume value is to be changed based on the user command, and to control the communicator to transmit a control signal for decreasing the first volume value based on the user command.

14. The user terminal device of claim 13, wherein if the user command is the volume decrease command, and the first volume value is lower than or equal to the preset volume value,
    the processor is configured to identify the user terminal device as the device of which the second volume value is to be changed based on the user command and to decrease the second volume value based on the user command.

15. The user terminal device of claim 9,
    wherein if a connection between the user terminal device and the external audio output device ends, the processor is configured so that the second volume value is changed to a volume value of the user terminal device before the user terminal device is connected to the external audio output device.

16. The user terminal device of claim 15, wherein if a connection end control signal is transmitted to the external audio output device, the processor is configured to control the communicator to transmit a control signal for changing the first volume value to a volume value of the external audio output device before the user terminal device is connected to the external audio output device.

17. A non-transitory computer readable recording medium having stored thereon a program which, when executed, causes a processor to preform operations comprising:
 transmitting a sound to an external audio output device;
 based on a user command for changing a volume of the sound output from the external audio output device being received, receiving at a user terminal device a first volume value of the external audio output device from the external audio output device;
 identifying one of the first volume value and a second volume value of the user terminal device based on the user command; and
 changing one of the first volume value and the second volume value based on the identified volume value.

* * * * *